United States Patent Office 2,940,967
Patented June 14, 1960

2,940,967

PROCESS FOR THE PREPARATION OF ANDROSTERONE AND INTERMEDIATES THEREFOR

Franz Sondheimer, Rehovoth, Israel, and George Rosenkranz, Mexico City, Mexico, assignors to Syntex S.A., Mexico City, Mexico, a corporation of Mexico.

No Drawing. Filed July 3, 1956, Ser. No. 595,591

Claims priority, application Mexico July 11, 1955

4 Claims. (Cl. 260—239.55)

The present invention relates to a novel process for the preparation of cyclopentanophenanthrene compounds as well as to certain novel cyclopentanophenanthrene compounds.

More particularly, the present invention relates to a novel process for the preparation of androsterone, to certain intermediates for the preparation thereof, and to certain novel esters thereof. Androsterone is a natural hormone of the androgenic type. It is, however, a difficultly obtainable compound in any quantity, and therefore has been little utilized in the past.

In accordance with the present invention, it has been discovered that certain specific esters of androsterone are extremely desirable hormones in that they have a prolonged anabolic effect in the human organism. There has further been discovered in accordance with the present invention, a novel process for the production of androsterone from the easily obtainable epi-androsterone so that these novel esters may be prepared in an efficient manner by known esterification methods. There has further been discovered in accordance with the present invention, certain novel intermediates for the preparation of androsterone, namely Δ²-androstene-17-one, the 17-ethyleneketal of Δ²-androstene-17-one, and the 2,α3α-oxido derivative of the 17-ethyleneketal of androstane-17-one.

The novel process involving a part of the present invention may be exemplified by the following equation:

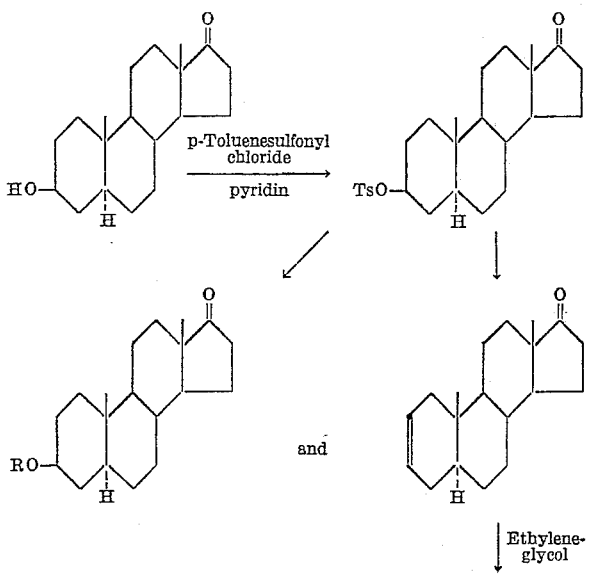

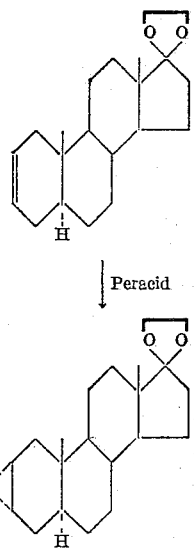

In the above equation Ts represents the tosylate radical and R represents either hydrogen or the acetate radical.

Referring to the above equation, epi-androsterone (androstane-3β-ol-17-one), which is easily obtained by hydrogenation of the abundant dehydro-epi-androsterone, is reacted with p-toluenesulfonyl chloride in the presence of anhydrous pyridine. Preferably for the reaction, the reaction mixture is kept standing at room temperature for a period of time of approximately one day. The resultant compound after purification is the p-toluenesulfonate (tosylate) of epi-androsterone.

The p-toluenesulfonate of epi-androsterone together with anhydrous sodium acetate in glacial acetic acid and acetic anhydride is then refluxed for a period of time of the order of five hours. Chloroform and water is then added to the reaction mixture, the aqueous layer is extracted with chloroform, and the solution after washing with dilute alkali such as sodium carbonate solution is then dried and evaporated. The residue of the evaporation is then chromatographed in a column with silica gel. Elution with benzene gives Δ²-androstene-17-one, and elution with benzene ether in the ratio of 2 parts of benzene to 1 part of ether gives the acetate of androsterone.

As indicated in the above equation, the by-product, namely Δ²-androstene-17-one, may also be converted to the desired androsterone. For this purpose, the Δ²-androstene-17-one is reacted with ethylene glycol in the presence of a catalytic amount of p-toluenesulfonic acid and in a suitable organic solvent such as anhydrous benzene. For the reaction, the reaction mixture is refluxed for a period of time of the order of 15 hours with continuous removal of the water formed during the reaction. The resultant product is the 17-ethyleneketal of Δ²-androstene-17-one. The ketal thus formed is then reacted with a peracid, preferably an aromatic peracid such as perbenzoic acid, in a suitable solvent such as benzene by keeping the reaction solution overnight at room temperature. The resultant compound is the 17-ethyleneketal of 2α,3α-oxido-androstane-17-one. To form the 17-ethyleneketal of androsterone, the oxido compound is reacted with lithium aluminum hydride. Cleavage of this last-mentioned compound with a cleavage agent such as a dilute acid, as for example acetic acid, gave the desired androsterone identical with that separated from the mixture previously set forth.

From the androsterone thus produced, there was prepared the novel valerate, hexanoate, enanthate, cyclopentylpropionate, phenylpropionate, furoate, trimethylacetate and undecenoate by reaction in a conventional manner with the corresponding acids, acid chlorides or acid anhydrides. All of the foregoing compounds proved to have a prolonged anabolic action.

The following specific examples serve to illustrate but are not intended to limit the present invention:

Example I

A mixture of 100 g. of epi-androsterone, 100 g. of p-toluenesulfonyl chloride (recently crystallized from ether) and 250 cc. of anhydrous pyridine was kept standing at room temperature for 20 hours. Chloroform and dilute hydrochloric acid was added and the chloroform extract was washed successively with dilute hydrochloric acid, sodium bicarbonate solution and water, dried over sodium sulfate and evaporated to dryness. Crystallization from ether afforded 136 g. of the p-toluenesulfonate of epi-androsterone with melting point 163°–164° C. (decomp.).

112.5 g. of the above substance and 112.5 g. of anhydrous sodium acetate in 1 lt. of glacial actic acid and 100 cc. of acetic anhydride was refluxed for 5 hours. Chloroform and water were added, the aqueous layer was extracted with chloroform and the organic solution was washed with sodium carbonate solution and water, dried and evaporated. The residue was chromatographed in a column with 1.3 kg. of silica gel. Elution with benzene yielded 37.5 g. of $\Delta^2$-androstene-17-one which after crystallization from ether had a melting point of 105°–106° C. Elution with benzene-ether (2:1) produced 32.8 g. of the acetate of androsterone with a melting point of 164°–165° C.

A solution of 34.1 g. of the acetate of androsterone and 40 g. of potassium carbonate in 2 lt. of methanol and 400 cc. of water was refluxed for 3 hours. The solution was concentrated to one half of its volume, diluted with water and extracted with chloroform. After washing and concentrating as described above, the product was crystallized from acetone-ether, thus yielding 28.9 g. of androsterone with a melting point of 184°–185° C.

Example II

A mixture of 30 g. of $\Delta^2$-androstene-17-one, 0.25 g. of p-toluenesulfonic acid, 25 cc. of recently distilled ethyleneglycol and 200 cc. of anhydrous benzene was refluxed for 15 hours using an adapter for the continuous removal of the water formed during the reaction. The mixture was poured into sodium carbonate solution and the organic layer was washed with water, dried and evaporated. Crystallization from methanol gave 25.2 g. of the 17-ketal with a melting point of 112°–113° C.

25.2 g. of this substance was dissolved in 100 cc. of benzene and mixed with a solution of 0.09 mol of perbenzoic acid in benzene. The solution was kept overnight at room temperature, washed with sodium carbonate and water, dried and evaporated. Crystallization from methanol produced 22.7 g. of the 2α,3α-oxido-17-ethylenedioxy-androstane with a melting point of 151°–152° C.

The oxido compound thus produced was dissolved in 300 cc. of anhydrous ether and the solution was slowly added to a suspension of 6.0 g. of lithium aluminum hydride in 300 cc. of ether. The mixture was stirred for 1 hour, and then kept overnight at room temperature. The excess of reagent was decomposed by the cautious addition of ethyl acetate and the product was isolated as described in the previous paragraphs. The total residue of the 17-cycloethyleneketal of androsterone weighed 22.4 g. and had a melting point of 140°–141° C. This substance was heated for 1 hour in a mixture of 200 cc. of glacial acetic acid and 200 cc. of water on the steam bath. By cautious addition of a sodium bicarbonate solution followed by extraction with chloroform finally yielded 13.1 g. of androsterone with a melting point of 183°–184° C., which on direct comparison proved to be identical to the one obtained in accordance with Example I, and when combined therewith gave a total yield of approximately 60%.

Example III

A solution of 2 g. of androsterone in 20 cc. of anhydrous pyridine was cooled in ice and treated dropwise and under stirring with 1.25 g. of n-valeryl chloride. The mixture was kept for 18 hours at room temperature, heated on the steam bath for 30 minutes, poured into water, extracted with ether, and the ether solution was washed 5 times with 10% hydrochloric acid, with water to neutral, dried over sodium sulfate and evaporated to dryness. The residue was chromatographed in a column with 50 g. of washed alumina, the fractions eluted from the column with benzene-hexane (60:40) were combined and crystallized from hexane, thus giving 1.5 g. of the valerate of androsterone with a melting point of 88°–91° C. $[\alpha]_D$ +79° (chloroform).

Example IV

Following the procedure described in Example III, the reaction of 2 g. of androsterone with 1.39 g. of n-hexanoyl chloride yielded 1.91 g. of the hexanoate of androsterone with a melting point of 105°–106° C., $[\alpha]_D$ +78° (chloroform).

Example V

Following the procedure described in Example III, the reaction of 1.5 g. of androsterone with 1.275 g. of n-enanthoyl chloride afforded 1.48 g. of the enanthate of androsterone with a melting point of 83°–85° C., $[\alpha]_D$ +71° (chloroform).

Example VI

Following the procedure described in Example III, the reaction of 1.5 g. of androsterone with 1.25 g. of cyclopentylpropionyl chloride gave 1.51 g. of the cyclopentylpropionate of androsterone with a melting point of 108°–110° C., $[\alpha]_D$ 70° (chloroform).

Example VII

Following the method described in Example III, the reaction of 1.5 g. of androsterone with 1.31 g. of phenylpropionyl chloride yielded 1.5 g. of the phenylpropionate of androsterone with a melting point of 159°–161° C., $[\alpha]_D$ +68° (chloroform).

Example VIII

Following the procedure described in Example III, the reaction of 1.5 g. of androsterone with 1.14 g. furoyl chloride afforded 1.57 g. of the furoate of androsterone with a melting point of 177°–178° C., $[\alpha]_D$ +80° (chloroform).

Example IX

Following the procedure described in Example III, the reaction of 1.5 g. of androsterone with 0.94 g. of trimethylacetyl chloride yielded 1.25 g. of the trimethylacetate of androsterone with a melting point of 142°–144° C., $[\alpha]_D$ +81° (chloroform).

Example X 1.5 g. of androsterone and 1.57 g. of undecenoyl chloride was treated in the same way as described in Example III. At the end of the operation the residue was chromatographted in a column with 150 g. of washed alumina, and the fractions eluted from the column with hexane-benzene 80:20 and 20:80 consisted of the undecenoate of androsterone. The product did not crystallize, but was obtained in the form of an oil $[\alpha]_D$ —67° (chloroform) $N_D^{20}=1.5068$.

We claim:

1. A process for the preparation of androsterone which comprises reacting $\Delta^2$-androstene-7-one with ethylene glycol in the presence of an acid to form the corresponding ethylene ketal, oxidizing the ketal with a peracid to produce the corresponding $2\alpha,3\alpha$-oxido compound, treating the oxido compound with lithium aluminum hydride to form the corresponding ketal of androsterone and treating the ketal with an acid medium to form androsterone therefrom.

2. The process of claim 1 wherein the 17-ethyleneketal of $\Delta^2$-androstene-17-one is prepared by reaction with ethyleneglycol in the presence of p-toluenesulfonic acid, the peracid is perbenzoic acid, and the acid medium is dilute acetic acid.

3. The 17-ethylene ketal of $\Delta^2$-androstene.

4. The 17-ethylene ketal of $2\alpha,3\alpha$-oxido-androstane.

References Cited in the file of this patent

UNITED STATES PATENTS

| 2,165,655 | Ruzicka | July 11, 1939 |
| 2,192,935 | Schoeller | Mar. 12, 1940 |
| 2,335,616 | Tendick | Nov. 30, 1943 |
| 2,374,369 | Miescher | Apr. 24, 1945 |
| 2,695,287 | Wendler | Nov. 23, 1954 |
| 2,844,601 | Pederson et al. | July 22, 1958 |

OTHER REFERENCES

Fajkos et al.: Chem. Abstracts, vol. 49, columns 357–358 (1955) (effective date—1954).